(12) United States Patent
Calkin

(10) Patent No.: US 9,022,134 B2
(45) Date of Patent: May 5, 2015

(54) FIRE-RESISTANT RESCUE BLANKET

(75) Inventor: Carston R. Calkin, Tualatin, OR (US)

(73) Assignee: Skedco, Inc., Tualatin, OR (US)

( * ) Notice: Subject to any disclaimer, the term of this patent is extended or adjusted under 35 U.S.C. 154(b) by 615 days.

(21) Appl. No.: 13/252,380

(22) Filed: Oct. 4, 2011

(65) Prior Publication Data

US 2013/0084435 A1 Apr. 4, 2013

(51) Int. Cl.
A62C 8/00 (2006.01)
B32B 23/02 (2006.01)

(52) U.S. Cl.
CPC ......... B32B 23/02 (2013.01); Y10T 428/24777 (2015.01)

(58) Field of Classification Search
CPC ................. B32B 23/02; Y10T 428/24777
USPC ................. 169/50, 49, 54; 428/192, 212, 218; 294/152
See application file for complete search history.

(56) References Cited

U.S. PATENT DOCUMENTS 2,720,269 A * 10/1955 Diacos ............................ 169/50
2,788,530 A * 4/1957 Ferguson ......................... 5/628
4,956,218 A    9/1990 Haining
5,083,617 A    1/1992 Pierce, Jr.
6,581,998 B1 * 6/2003 Clemens ....................... 294/141
2006/0264142 A1 * 11/2006 Wenstrup et al. ............. 442/415

FOREIGN PATENT DOCUMENTS

GB    2395461    * 5/2004

* cited by examiner

Primary Examiner — Dinh Q Nguyen
(74) Attorney, Agent, or Firm — Stoel Rives LLP

(57) ABSTRACT

A fire-resistant rescue blanket sized to underlay and wrap around a victim for protecting the victim from fire-related injuries. The fire-resistant rescue blanket includes layers of a flame-resistant material for protecting against fire injuries, a heat-reflective fabric for protecting against environmental heat conditions, and a protective fabric for protecting against fallen debris. The heat-reflective fabric is arranged along an inner surface of the flame-resistant material and contacts the victim when the victim is wrapped in the fire-resistant rescue blanket. The protective fabric is arranged on the opposing outer surface covering at least underneath the area where the victim is laying to protect the wrapped victim against debris, such as during a dragging operation. The fire-resistant rescue blanket includes a plurality of loop handles for allowing rescue personnel to carry the victim if necessary. A drag strap may also be attached to the fire-resistant rescue blanket for facilitating a dragging operation.

10 Claims, 4 Drawing Sheets

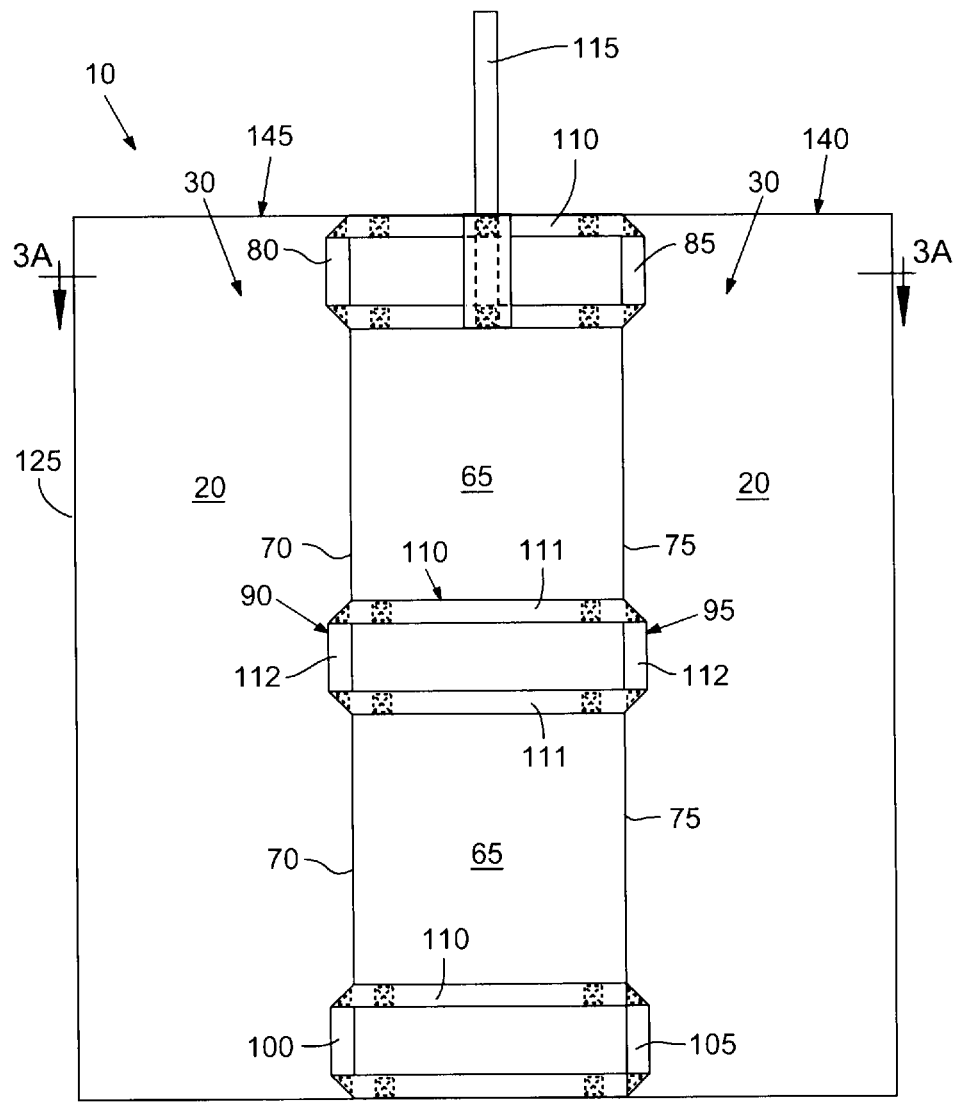
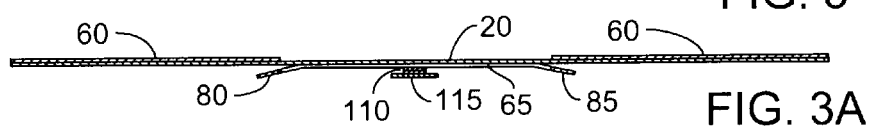
FIG. 3
FIG. 3A

FIRE-RESISTANT RESCUE BLANKET

TECHNICAL FIELD

The field of this disclosure relates to fire-resistant rescue blankets, and more particularly, to fire-resistant rescue blankets capable of protecting a victim from environmental dangers and having handles or straps to facilitate carrying or dragging extrication operations.

BACKGROUND

Fire blankets capable of protecting a user from fire-related injuries are known. For example, U.S. Pat. No. 4,956,218 of Haining describes a fire protection blanket comprised of a flexible, layered blanket having two layers of a fire-resistant material sandwiched between an insulating layer and including straps arranged in a tic-tac-toe pattern to provide a plurality of grasping loops for holding the blanket over the user. Other examples of fire blankets for protecting a victim from a fire may be found in the prior art. Such blankets are generally not designed for carrying or otherwise supporting a victim, but merely as a protective covering held by the victim.

The present inventor has identified a need for a fire-resistant rescue blanket with handles and/or drag straps for carrying or dragging a person laying in the fire-resistant rescue blanket during extrication operations. Additionally, the present inventor has identified a need for such a rescue blanket capable of serving as an extraction platform and protecting a person from metal, glass, or other potentially harmful debris during extrication operations. The present inventors have also identified a need for such a fire-resistant rescue blanket made of lightweight and flexible material to simplify storage and increase portability.

Additional aspects and advantages will be apparent from the following detailed description of preferred embodiments, which proceeds with reference to the accompanying drawings.

SUMMARY

Apparatuses and methods are disclosed for one or more of improved casualty and extrication protective equipment, improved shielding from debris during extrication operations, and improved defense against environmental hazards and extremes, such as heat. In certain preferred apparatuses, a fire-resistant rescue blanket comprises a flame-resistant fabric layer, a heat-reflective fabric layer, and a puncture-resistant and/or abrasion-resistant fabric layer. For example, one embodiment of the fire-resistant rescue blanket includes a flame-resistant fabric layer, a heat-reflective fabric layer, a protective fabric layer, and a plurality of loop candles. The fire-resistant rescue blanket may include a drag strap attached to the protective fabric layer for aiding rescue personnel in dragging to safety a victim secured in the rescue blanket.

Additional aspects and advantages will be apparent from the following detailed description of preferred embodiments, which proceeds with reference to the accompanying drawings.

BRIEF DESCRIPTION OF THE DRAWINGS

FIG. 3 is the fire-resistant rescue blanket of FIG. 1 and FIG. 3A is a cross-sectional view illustrating multiple fabric layers in accordance with an example embodiment.

DETAILED DESCRIPTION OF PREFERRED EMBODIMENTS

The described features, structures, characteristics, and methods may be combined in any suitable manner in one or more embodiments. In view of the disclosure herein, those skilled in the art will recognize that various embodiments can be practiced without one or more of the specific details or with other methods, components, materials, or the like.

Figure 4:
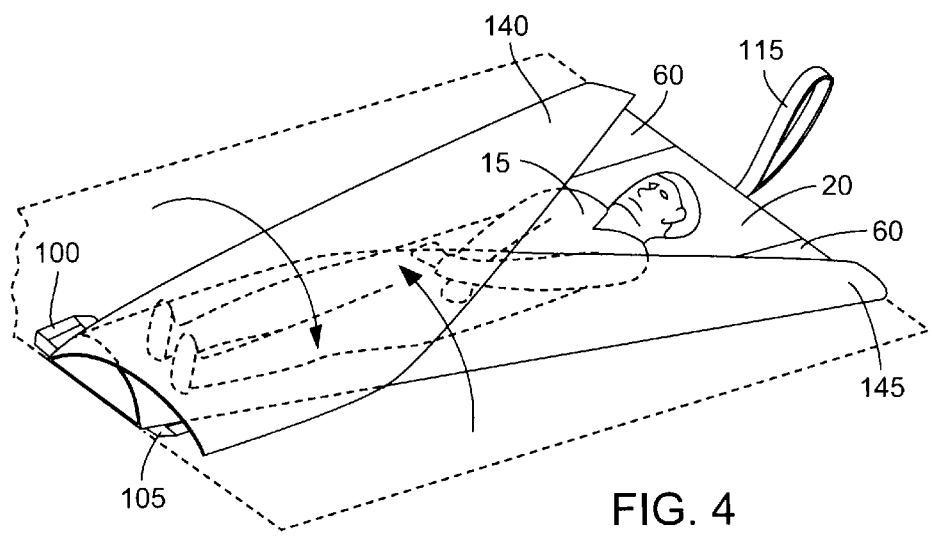
FIG. 4 is a pictorial view illustrating the fire-resistant rescue blanket of FIG. 1 in a partially-folded configuration.
Figure 5:
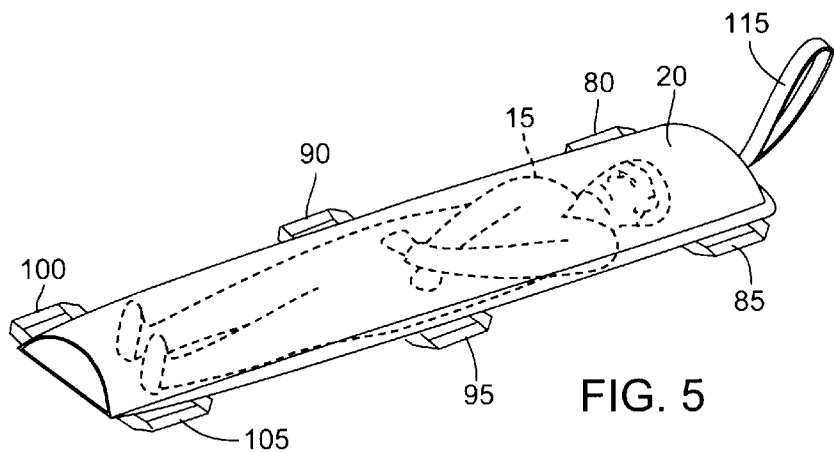
FIG. 5 is a pictorial view of the fire-resistant rescue blanket of FIG. 1 in a fully-folded configuration.

FIGS. 1-3A illustrate a plan view of an outer surface, a plan view of an inner surface, and a cross-sectional view, respectively, of a fire-resistant rescue blanket 10. FIGS. 4 and 5 illustrate a pictorial view of the fire-resistant rescue blanket 10 in a partially folded and fully folded configuration. With reference to FIGS. 1-5, the fire-resistant rescue blanket 10 may be used to protect and safely extract a potentially injured victim 15 from a hazardous environment, such as during a fire, earthquake, or other emergency. The fire-resistant rescue blanket 10 includes a flame-resistant layer 20 to help protect the victim 15 from fire and burning injuries, a heat-reflective fabric layer 60 to help reflect extreme environmental heat, and a puncture-resistant and/or abrasion-resistant protective fabric layer 65 to help protect the victim 15 from metal, glass, or other potentially dangerous debris during an extrication operation. The fire-resistant rescue blanket 10 also includes a plurality of loop handles 80, 85, 90, 95, 100, and 105 for carrying the victim 15 to safety and may include a drag strap 115 for dragging the victim 15 if necessary, such as through narrow areas or during operations with only a single rescuer. The fire-resistant rescue blanket 10 is preferably formed using lightweight and flexible materials to reduce storage requirements and lighten carrying burdens.

Figure 1:
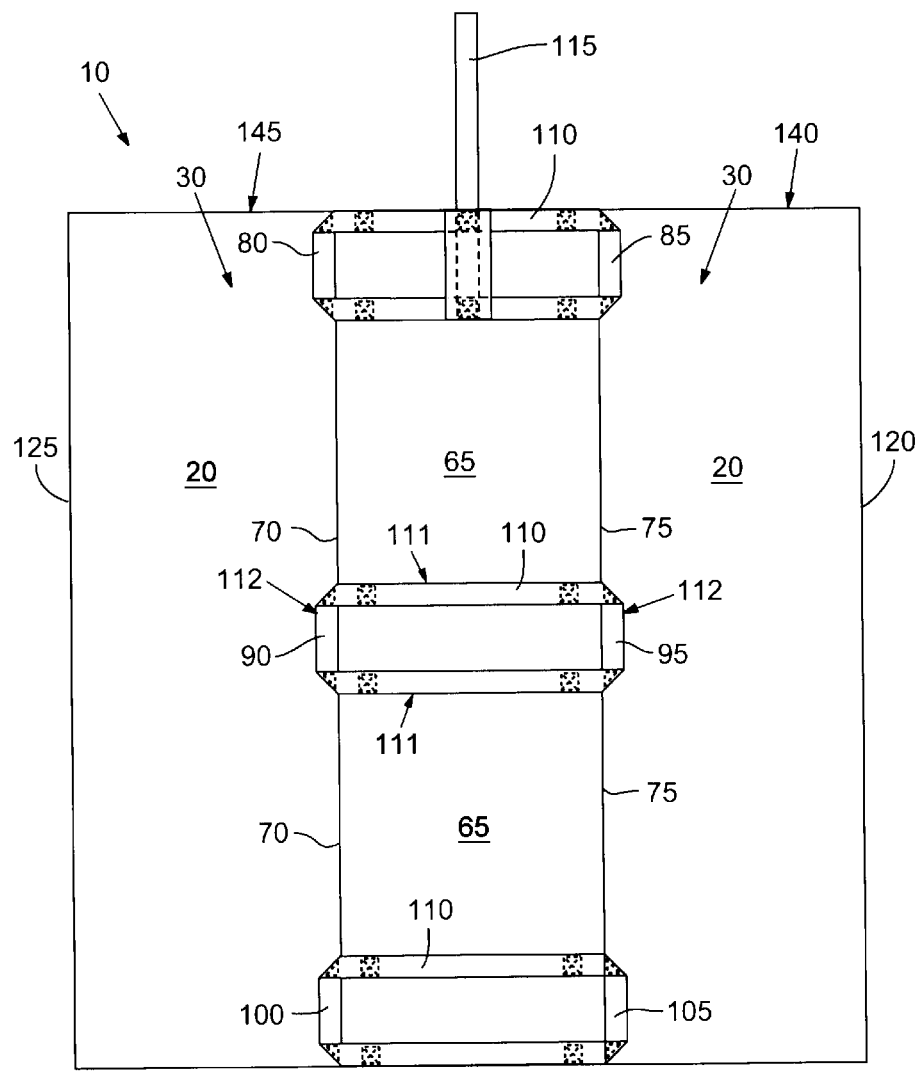
FIG. 1 is a plan view of an outer surface of a fire-resistant rescue blanket illustrating a plurality of loop handles and a drag strap in accordance with an example embodiment.
Figure 2:
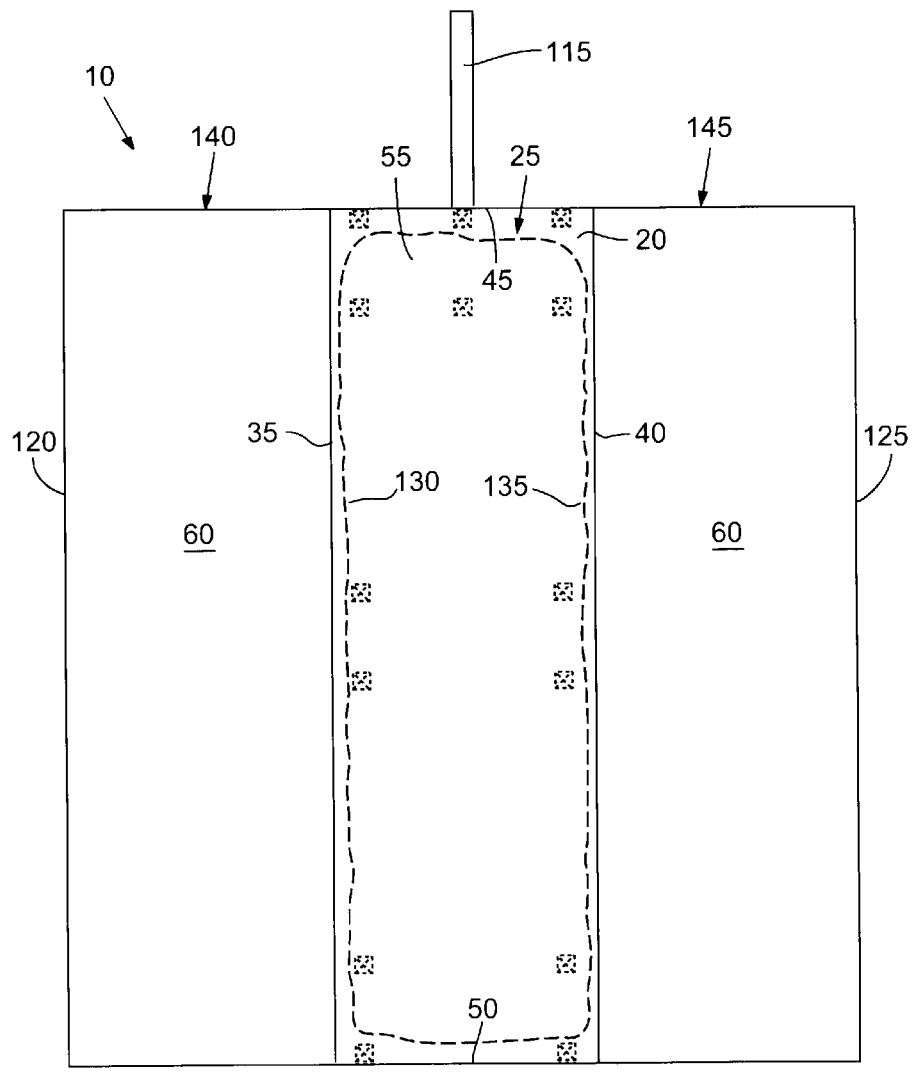
FIG. 2 is a plan view of an inner surface of the fire-resistant rescue blanket of FIG. 1 showing a body region sized to underlay the body of an adult victim according to an example embodiment.

FIGS. 1 and 2 illustrate a plan view of an outer surface 30 and an inner surface 25, respectively, of an example embodiment of the fire-resistant rescue blanket 10. The inner surface 25 of the fire-resistant rescue blanket 10 includes a flame-resistant layer 20 preferably spanning the entirety and forming a central layer of fire-resistant rescue blanket 10 (see FIG. 3A) and a heat-reflective fabric layer 60 attached to and covering at least a portion of the flame-resistant layer 20.

The flame-resistant layer 20 is made of flame-resistant material. Flame resistance and retardancy in materials is primarily measured using a Limiting Oxygen Index (LOI) rating. Generally, an LOI rating is determined by igniting the top of a sample material using a gas flame, withdrawing the flame once ignition has occurred, and measuring the lowest atmospheric oxygen concentration necessary to support and sustain burning. A higher LOI rating represents better flame-retardancy LOI tests can be conducted in accordance with national and international standards including BS 2782 (Part 1, Method 141), ASTM D2863, and ISO 4589-2.

Under normal conditions, since air comprises approximately 21% oxygen by volume, a material with an LOI rating of 21 or below generally burns easily in air. Materials primarily comprising cotton, rayon, or acrylic fibers generally have LOI ratings ranging between 16 and 20, and fall in this category of easily burn materials. More thermally stable materials comprising meta-aramid fibers, such as NOMEX® manufactured by DuPont and CONEX® manufactured by Teijin, and para-aramid fibers, such as KEVLAR® manufactured by DuPont, generally have an LOI ranging between 27 and 36. Other materials comprising oxidized polyacrylonitrile fibers (OPF), may have LOI ratings exceeding 45. For example, OPF-based CARBONX® fabric, manufactured by Chapman Innovations, has an LOI rating of at least 55.

In one embodiment, the flame-resistant layer 20 is made of flame-resistant material comprising oxidized polyacrylonitrile fibers and having an LOI of at least 45. In another embodiment, the flame-resistant layer 20 may be made of flame-resistant material having an LOI rating at least exceeding 21. In yet other embodiments, the flame-resistant layer 20 may comprise material have an LOI rating between 22 and 55. other flame-resistant materials having higher LOI ratings than materials described herein may be used.

The flame-resistant layer 20 includes opposing inner and outer surfaces 25, 30, opposing inner left and right margins 35, 40, and opposing header and footer edges 45, 50. The inner surface 25 of the flame-resistant layer 20 further includes an interior body region 55 having opposing left and right margins 130, 135 and sized to completely underlay an adult victim 15. The interior body region 55 is preferably located substantially centered on the flame-resistant layer 20 between the opposing left and right margins 35, 40 and the opposing header and footer edges 45, 50 on the inner surface 25. In some embodiments, the interior body region 55 may cover the entire area spanning between the opposing left and right margins 35, 40 and the opposing header and footer edges 45, 50 of the flame-resistant layer 20. In such embodiments, the inner left and right margins 35, 40 of the flame-resistant layer 20 overlap the opposing left and right margins 130, 135 of the interior body region 55.

In a preferred embodiment, the fire-resistant rescue blanket 10 further includes a heat-reflective fabric layer 60 for protecting the victim 15 against environmental heat. The heat-reflective fabric layer 60 is sewn or otherwise attached to cover at least a portion of the inner surface 25 of the flame-resistant layer 20. The heat-reflective fabric layer 60 may be sewn along the inner left and right margins 35, 40, the outer left and right margins 120, 125, and the header and footer edges 45, 50 to form a pair of flaps 140, 145. The flaps 140, 145 are dimensioned equally and sized to fold over the interior body region 55 to protect an adult victim 15 laying therein (see FIGS. 4 and 5). The heat-reflective fabric layer 60 preferably overlays the flame-resistant layer 20 such that the flaps 140, 145 are dual-layered comprising both heat-reflective material and flame-resistant material (see FIG. 3A).

In some embodiments, the weight of the flaps 140, 145 maintains the fire-resistant rescue blanket 10 in a closed configuration during extraction (see FIG. 5). In other embodiments, the fire-resistant rescue blanket 10 may further include fasteners, such as a hook-and-loop fastener combination, or other interlocking fastener combinations, such as buttons, to removably secure the flaps 140, 145 during extraction. For example, in one such embodiment, the flap 140 may include a strip or multiple strips of a hook fastener arranged near the right margin 120 and the flap 145 may include a strip or multiple strips of a loop fastener in a corresponding arrangement near the left margin 125 so that the flaps 140, 145 may be removably secured using the hook-and-loop fastener combination during extraction.

In some embodiments, the heat-reflective layer 60 comprises aluminized fabric (fabric containing aluminum fibers), such as CarbonX® Aluminized Fabric manufactured by Chapman Innovations, and may be sewn along the inner left and right margins 35, 40 using fire-resistant threading, such as KEVLAR® brand threading manufactured by DuPont. In other embodiments the heat-reflective layer 60 may include other metallic filaments such as gold, copper, iron, silver, nickel, or other metals capable of protecting against environmental heat.

In some embodiments, the interior body region 55 may be located off-center on the flame-resistant layer 20, such as over toward outer left margin 120 or toward outer right margin 125, for example. In such embodiments, the flaps 140, 145 may not be equally dimensioned, but one flap, for example flap 145, may be substantially wider to fold over the off-centered interior body region 55 and protect the victim 15. In other embodiments, the heat-reflective fabric layer 60 can completely overlay the flame-resistant layer 20 forming a layered fire-resistant rescue blanket 10 having a full layer of flame-resistant material covered by a layer of heat-reflective material to provide protection to person 15 regardless of where the interior body region 55 is located.

With reference to FIG. 1, the fire-resistant rescue blanket 10 includes a protective fabric layer 65 made of durable, puncture-resistant, and/or abrasion-resistant material and attached to the outer surface 30 to protect the victim 15 laying in the interior body region 55 during a dragging extrication operation. The protective fabric layer 65 is preferably sewn or otherwise fixedly attached to the outer surface 30 of the flame-resistant layer 20 along opposing left and right margins 70, 75 using flame-resistant and/or abrasion-resistant threading. The opposing left and right margins 70, 75 are preferably located opposite the inner left and right margins 35, 40 of the inner surface 25 such that the protective fabric layer 65 is substantially centered along the outer surface 30 so that it at least covers an outer surface substantially aligned with the interior body region 55. In some embodiments, the protective fabric layer 65 and the heat-reflective fabric layer 60 may be attached to the flame-resistant fabric layer 20 along a single seam line at their respective left and right margins 35, 40, 70, 75.

In other embodiments, the protective fabric layer 65 may not be centered along the outer surface 30, but instead aligned to correspond with the location of the interior body region 55 on the inner surface 25. For example, in the embodiment described previously where the interior body region 55 is off-centered toward the outer left edge 120 of the inner surface 25, the protective fabric layer 65 may be similarly off-centered toward the outer left edge 120 on the outer surface 30 to protect a person 15 during a dragging extrication operation. In other embodiments, both the location of the interior body region 55 and the corresponding location of the protective fabric layer 65 may differ than those embodiments described herein, but the protective fabric layer 65 preferably at least covers an area on the outer surface 30 corresponding to the location and dimension of the interior body region 55.

In some embodiments, the protective fabric layer 65 may completely cover and overlay the entire outer surface 30. Such an arrangement may be useful to provide additional protection against potentially sharp or dangerous objects that may be elevated off the ground, such as a piece of broken wood or a broken pipe protruding from a wall. In such embodiments, the flaps 140, 145 may comprise three layers of material with the flame-resistant layer 20 sandwiched between the heat-reflective layer 60 and the protective fabric layer 65.

Preferably, the protective fabric layer 65 is made of reinforced fabric material comprising para-aramid fibers, such as ARASHIELD™ manufactured by TenCate, and having a Martindale abrasion rating exceeding 900,000 according to the ISO 12947-2: 2002 test method. In other embodiments, the protective fabric layer 65 may be made of other meta-aramid or para-aramid fibers having a Martindale abrasion rating ranging from between 45,000 to about 100,000, such as NOMEX III® or KEVLAR®, manufactured by DuPont, and GLENGUARD®, manufactured by Glen Raven. In yet other embodiments, the protective fabric layer 65 may be made of other materials with a Martindale abrasion rating of at least 30,000. It should be understood that the materials mentioned herein are for illustration purposes only and are not meant to be limiting. Other materials than those mentioned herein may be used without departing from the principles of the embodiments described.

In some embodiments, the protective fabric layer 65 includes a plurality of loop handles 80, 90, and 100 located along or adjacent to the left margin 70 and loop handles 85, 95, and 105 located along or adjacent to the right margin 75 separated into distinct handle pairs (for example, 80 and 85 comprise one handle pair). Each loop handle pair may be formed from a single reinforced webbing 110 attached to the protective fabric layer 65. The reinforced webbing 110 has a generally rectangular shape with a pair of elongate sections 111 and a pair of shorter sections 112 oriented substantially perpendicular to the elongate sections 111. The elongate sections 111 are generally sized to span the length of the protective-fabric layer 65 between left and right margins 70, 75 and the shorter sections 112 are generally sized to accommodate an adult human hand. The reinforced webbing 110 is sewn onto protective fabric layer 65 along the elongate sections 111, and the shorter sections 112 are left free and form the loop handles 80, 85, 90, 95, 100, and 105.

In some embodiments, the fire-resistant rescue blanket 10 may further include fasteners, such as a hook-and-loop fastener combination, or other interlocking fastener combinations, such as buttons, to removably secure the shorter sections 112 of the loop handles 80, 85, 90, 95, 100, and 105 against the fire-resistant rescue blanket 10 in a substantially flat configuration. In one such embodiment, a back surface of the shorter section 112 of the loop handle 80 may include an arrangement of one or more strips of a hook fastener. In operation, the hook fastener engages the fabric on the outer surface 30 of the flame-resistant fabric layer 20 when the hook fastener is pressed against the flame-resistant fabric layer 20. In this embodiment, the fabric of the flame-resistant fabric layer 20 functions as the loop portion of a conventional hook-and-loop fastener, thus eliminating the need for attaching a separate loop portion to the fire-resistant rescue blanket 10. In other embodiments, a conventional hook-and-loop combination may be used with the hook portion attached to the shorter section 112 as described and a separate loop portion attached to the outer surface 30 and arranged to engage the hook fastener.

In some embodiments, the reinforced webbing 110 may comprise the same or similar material as the protective fabric layer 65, such as a KEVLAR® brand webbing manufactured by DuPont, and may be sewn onto the flame-resistant layer 20 using fire-resistant threading. In other embodiments, the fire-resistant rescue blanket 10 may not include the reinforced webbing 110 and the plurality of loop handles 80, 85, 90, 95, 100, and 105 may instead each be individually sewn or otherwise attached to the protective fabric layer 65 along opposing margins 70, 75.

Preferably, each loop handle pair (e.g. 80, 85) is spaced apart from another loop handle pair (e.g. 90, 95) to provide adequate spacing for a group of people to carry fire-resistant rescue blanket 10 during an extrication operation. Some embodiments may include more or less loop handles arranged in a different configuration as described herein. For example, one embodiment may include loop handles located along header and footer edges 45, 50 to allow rescue personnel to position themselves at the head and/or the foot of the victim 15 to carry the victim 15 through narrow doors of areas.

In some embodiments, a drag strap 115 may be sewn or otherwise attached to the elongate sections 111 of the reinforced webbing 110. The drag strap 115 may be oriented substantially perpendicular in relation to the elongate section 111 along a substantially central longitudinal axis between left and right margins 70, 75 of the protective fabric layer 65. The drag strap 115 extends beyond the header edge 45 of the fire-resistant rescue blanket 10 and may have a looped handle to provide a grasping point for rescue personnel. In some embodiments, the drag strap 115 may be made of a flame-resistant material or other suitable material with sufficient tensile strength for carrying out a dragging extrication operation of an adult victim 15.

In other embodiments, the fire-resistant rescue blanket 10 may include multiple drag straps for facilitating dragging by more than one rescuer or allowing a single rescuer to pull the victim 15 with both hands. For example, one drag strap may be attached to the protective fabric layer 65 near the left margin 70 in a similar fashion as previously described, and a second drag strap may be laterally spaced apart and attached near the right margin 75 of the protective fabric layer 65. Other arrangements not specifically described herein may be possible.

FIGS. 3 and 3A illustrate the rear view of the fire-resistant rescue blanket 10 and a cross-sectional view along section 3A showing the separate layers of one embodiment of the fire-resistant rescue blanket 10. The flame-resistant layer 20 spans the entire length and width of the fire-resistant rescue blanket 10. The heat-reflective fabric layer 60 is attached to the flame-resistant layer 20 and overlays the entire area from the left margin 35 to the outer left edge 120 and from the right margin 40 to the outer right edge 125 forming two, dual-layered flaps 140, 145 (see FIG. 2). The central, uncovered area of the flame-resistant layer 20 includes the interior body region 55 which underlays the victim 15 (see FIG. 2). The protective fabric layer 65 is attached to the outer surface 30 of the flame-resistant layer 20 and covers at least a portion on the outer surface 30 corresponding to the dimensions of the interior body region 55. The loop handles 80, 85 are formed as part of the reinforced webbing 110 and the drag strap 115 is sewn to the reinforced webbing 110.

In other embodiments, fire-resistant rescue blanket 10 may include multiple layers of one or more of the flame-resistant layer 20, the heat-reflective fabric layer 60, and/or the protective fabric layer 65 to provide additional support or enhanced characteristics to the fire-resistant rescue blanket 10. In yet other embodiments, the fire-resistant rescue blanket 10 may be made of a single integrated layer having flame-resistant material, heat-reflective material, and protective fabric material arranged in a configuration to provide protection against fire, heat, and dangerous debris.

FIGS. 4 and 5 illustrate the fire-resistant rescue blanket 10 in a partially closed and a fully-closed configuration, respectively, with the victim 15 laying inside. With reference to FIGS. 4 and 5, in a preferred operation, the fire-resistant rescue blanket 10 is laid flat on the ground with the outer surface 30 (not shown) and the protective fabric layer 65 (not shown) contacting the ground. The victim 15 rests on the interior body region 55 and the flaps 140, 145 are folded over the victim 15 so that at least a portion of the heat-reflective fabric layer 60 contacts the victim 15. Once the victim 15 is secured within the fire-resistant rescue blanket 10, rescue personnel can carry the victim 15 using the plurality of loop handles 80, 85, 90, 95, 100, and 105 as necessary.

In other extrication operations, the victim 15 may be extracted using a combination of dragging and/or carrying techniques. For example, the victim 15 may be carried over some obstacles that are harder to maneuver around and dragged through narrow areas or in situations where only one rescuer is available. In yet other extrication operations, the drag strap 115 and/or the plurality of loop handles 80, 85, 90, 95, 100, and 105 may be attached to a winch or other similar device to drag or hoist the victim 15 to safety, such as by helicopter. Other extrication operations not specifically mentioned herein may also be possible.

It will be obvious to those having skill in the art that many changes may be made to the details of the above-described embodiments without departing from the underlying principles of the invention. The scope of the present invention should, therefore, be determined only by the following claims.

The invention claimed is:

1. A fire-resistant rescue blanket comprising:
   a flame-resistant layer made of flame-resistant material having a limiting oxygen index of at least 22, the flame-resistant layer having an inner and an opposite outer surface, and a first edge and a second edge, wherein the inner surface includes an interior body region spanning between a header end and a footer end of the flame-resistant layer and sized to completely underlay an adult victim;
   a heat-reflective fabric layer overlaying at least a portion of the inner surface of the flame resistant layer, wherein the heat-reflective fabric layer and the flame-resistant layer form a first flap extending from the interior body region to the first edge, and a second flap extending from the interior body region to the second edge, the first and second flaps each sized to fold over the interior body region for protecting the victim from environmental heat;
   a protective fabric layer made of material having a Martindale abrasion rating of at least 30,000, the protective fabric layer disposed on the outer surface of the flame resistant layer and underlying the interior body region for protecting the victim laying in the body region during a dragging extrication operation;
   a first loop handle secured to the protective fabric layer; and
   a second loop handle secured to the protective fabric layer, wherein, when the first flap is folded over the interior body region and the second flap is folded over and onto the first flap, the first loop handle extends outwardly from a first side and the second loop handle extends outwardly from a second side of the fire-resistant rescue blanket.

2. The fire-resistant rescue blanket of claim 1, further comprising:
   a drag strap fixedly secured to the protective fabric layer between the first and second loop handles and extending beyond the header end of the flame resistant layer for dragging a victim laying in the interior body region.

3. The fire-resistant rescue blanket of claim 1, wherein each of the first and second loop handles further includes a fastener for removably securing the first and second loop handles to the outer surface of the flame-resistant layer.

4. The fire-resistant rescue blanket of claim 1, wherein the flame-resistant material in the flame-resistant layer comprises oxidized polyacrylonitrile fibers and wherein the heat-reflective fabric layer comprises aluminized fabric.

5. The fire-resistant rescue blanket of claim 1, wherein the flame-resistant material has a limiting oxygen index ranging between 23 and 55 and the protective fabric layer comprises material having a Martindale abrasion rating of at least 45,000.

6. The fire-resistant rescue blanket of claim 1, wherein the flame-resistant material has a limiting oxygen index of greater than 45.

7. The fire-resistant rescue blanket of claim 1, wherein the protective fabric layer comprises material having a Martindale abrasion rating of at least 100,000.

8. The fire-resistant rescue blanket of claim 1, wherein the protective fabric layer comprises material having a Martindale abrasion rating of at least 900,000.

9. The fire-resistant rescue blanket of claim 1, further comprising a single, continuous reinforced webbing secured to and extending across the protective fabric layer, wherein a first end and a second end of the reinforced webbing are left free from the protective fabric layer and respectively form the first and second loop handles.

10. The fire-resistant rescue blanket of claim 9, wherein the drag strap is further secured to the reinforced webbing.

* * * * *